United States Patent
Mueller et al.

(10) Patent No.: US 11,480,245 B2
(45) Date of Patent: Oct. 25, 2022

(54) EMERGENCY LUBRICATION SYSTEM FOR TILTROTOR AIRCRAFT

(71) Applicant: Bell Helicopter Textron Inc., Fort Worth, TX (US)

(72) Inventors: Douglas Robert Mueller, Coppell, TX (US); Colton Gilliland, Northlake, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 831 days.

(21) Appl. No.: 16/201,748

(22) Filed: Nov. 27, 2018

(65) Prior Publication Data

US 2020/0166119 A1     May 28, 2020

(51) Int. Cl.
*F16H 57/04*     (2010.01)
*F01M 11/06*     (2006.01)
*F16K 17/36*     (2006.01)
*B64C 27/28*     (2006.01)

(52) U.S. Cl.
CPC ....... *F16H 57/0442* (2013.01); *F01M 11/065* (2013.01); *F16H 57/0435* (2013.01); *F16H 57/0475* (2013.01); *F16K 17/363* (2013.01); *B64C 27/28* (2013.01)

(58) Field of Classification Search
CPC ............ F16H 57/0442; F16H 57/0443; F16H 57/0435; F01M 11/065; F01M 11/067; F01M 2011/068; F16K 17/363; G05D 16/18; B64C 29/0033; B64C 29/0075
See application file for complete search history.

(56) References Cited

U.S. PATENT DOCUMENTS

| | | | | | |
|---|---|---|---|---|---|
| 2,089,640 | A | * | 8/1937 | Cotterman | ............ F16K 17/363 137/45 |
| 2,239,098 | A | * | 4/1941 | Frank | ..................... B64D 37/22 137/38 |
| 2,433,405 | A | * | 12/1947 | Benjamin | ............... F16K 17/36 137/45 |
| 2,845,937 | A | * | 8/1958 | Kazimierz | ............ F16K 17/363 137/38 |
| 4,284,174 | A | * | 8/1981 | Salvana | ................... F01D 25/18 184/6.26 |
| 4,717,000 | A | * | 1/1988 | Waddington | ............ F01D 25/18 184/6.1 |
| 5,054,716 | A | * | 10/1991 | Wilson | ................ B64C 29/0033 244/56 |

(Continued)

FOREIGN PATENT DOCUMENTS

WO     2017027180 A1     2/2017

*Primary Examiner* — Minh Truong
(74) *Attorney, Agent, or Firm* — Pramudji Law Group PLLC; Ari Pramudji

(57) ABSTRACT

Various implementations described herein are directed to an emergency lubrication system for a tiltrotor aircraft. The emergency lubrication system includes a pressurized material chamber, a lubrication chamber, a first valve between the pressurized material chamber and the lubrication chamber, a gearbox, and a second valve between the lubrication chamber and the gearbox. The first valve is configured to operate in a first mode when the emergency lubrication system is in a first configuration and a second mode when the emergency lubrication system is in a second configuration.

12 Claims, 3 Drawing Sheets

(56) References Cited

U.S. PATENT DOCUMENTS

| | | | | |
|---|---|---|---|---|
| 6,463,819 B1* | 10/2002 | Rago | .................... | F01M 11/067 |
| | | | | 137/115.26 |
| 8,051,869 B2* | 11/2011 | Parnin | .................... | F16K 17/36 |
| | | | | 137/1 |
| 8,230,974 B2* | 7/2012 | Parnin | .................... | F01D 25/18 |
| | | | | 184/6.11 |
| 8,651,240 B1* | 2/2014 | Motto | .................... | F01D 25/18 |
| | | | | 184/7.4 |
| 9,599,212 B2 | 3/2017 | Poster | | |
| 9,683,652 B2 | 6/2017 | Poster | | |
| 2006/0211363 A1* | 9/2006 | Coxon | ................. | F16K 17/363 |
| | | | | 454/227 |
| 2010/0024885 A1* | 2/2010 | Minty | ................ | F02M 37/0082 |
| | | | | 137/1 |
| 2011/0168495 A1* | 7/2011 | Subramaniam | ......... | F03D 80/70 |
| | | | | 184/6.12 |
| 2017/0305568 A1* | 10/2017 | King | ....................... | B64C 27/28 |
| 2018/0079487 A1 | 3/2018 | Ivans et al. | | |
| 2020/0166120 A1* | 5/2020 | Henry | .................... | B64C 11/28 |

\* cited by examiner

EMERGENCY LUBRICATION SYSTEM FOR TILTROTOR AIRCRAFT

STATEMENT REGARDING FEDERALLY SPONSORED RESEARCH OR DEVELOPMENT

Not applicable.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

In typical gearboxes for tiltrotor aircraft, an emergency lubrication system may be activated in a loss of lubrication scenario. In these prior systems, when primary lubrication is lost, reserve lubrication is provided to the gearbox to allow time to land without significant gearbox failure. Prior art systems are only configured to provide a pre-set flow rate for oil provided to the gearbox for a pre-set amount of time until the supply of oil is exhausted.

SUMMARY

Described herein are various implementations of an emergency lubrication system for a tiltrotor aircraft. In one implementation, the emergency lubrication system includes a pressurized material chamber, a lubrication chamber, a first valve between the pressurized material chamber and the lubrication chamber, a gearbox, and a second valve between the lubrication chamber and the gearbox. The first valve is configured to operate in a first mode when the emergency lubrication system is in a first configuration and a second mode when the emergency lubrication system is in a second configuration.

In one implementation, the first valve operates in the first mode and the second mode upon actuation of the second valve. The first valve may be closed in the first mode and open in the second mode.

In one implementation, the first valve may be partially open at a plurality of intermediate orientations between the first mode and the second mode. The plurality of intermediate orientations may correspond to an angle of tilt of the emergency lubrication system.

The pressurized material chamber may include pressurized gas, pressurized liquid, or pressurized air.

In one implementation, the first valve may be an orientation-based or weight-based valve. In one implementation, the orientation-based or weight-based valve may be a pendulum valve. In one implementation, the second valve may be a solenoid valve.

In one implementation, the first valve may be configured to alternate between the first mode and the second mode.

Also described herein are various implementations of a method for providing an emergency lubrication system in a tiltrotor aircraft. In one implementation, a first valve is actuated to indicate a loss of lubrication situation. A second valve is configured to operate in a first lubrication mode during the loss of lubrication situation when the emergency lubrication system is in a first configuration. The second valve is configured to operate in a second lubrication mode during the loss of lubrication situation when the emergency lubrication system is in a second configuration.

In one implementation, during the first lubrication mode, the second valve may be closed. When the second valve is closed, lubrication from a lubrication chamber can be configured to drip into a gearbox In one implementation, during the second lubrication mode, the second valve may be open. When the second valve is open, lubrication from a lubrication chamber can be configured to be forced into a gearbox by pressurized material from a pressurized material chamber.

In one implementation, the emergency lubrication system may alternate between the first lubrication mode and the second lubrication mode.

Also described herein are various implementations of a method for providing an emergency lubrication system in a tiltrotor aircraft. In one implementation, a first valve is actuated to indicate a loss of lubrication situation. A second valve is configured to operate in a drip mode during the loss of lubrication situation when the emergency lubrication system is in a horizontal configuration. The second valve is configured to operate in a pressurized lubrication mode during the loss of lubrication situation when the emergency lubrication system is in a vertical configuration. The second valve is configured to operate at a plurality of intermediate modes corresponding to a plurality of intermediate orientations of the emergency lubrication system between the horizontal configuration and the vertical configuration.

In one implementation, a pressurization of lubrication is varied from a minimum pressurization in drip mode to a maximum pressurization in pressurized lubrication mode including the plurality of intermediate orientations.

The above referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1A:
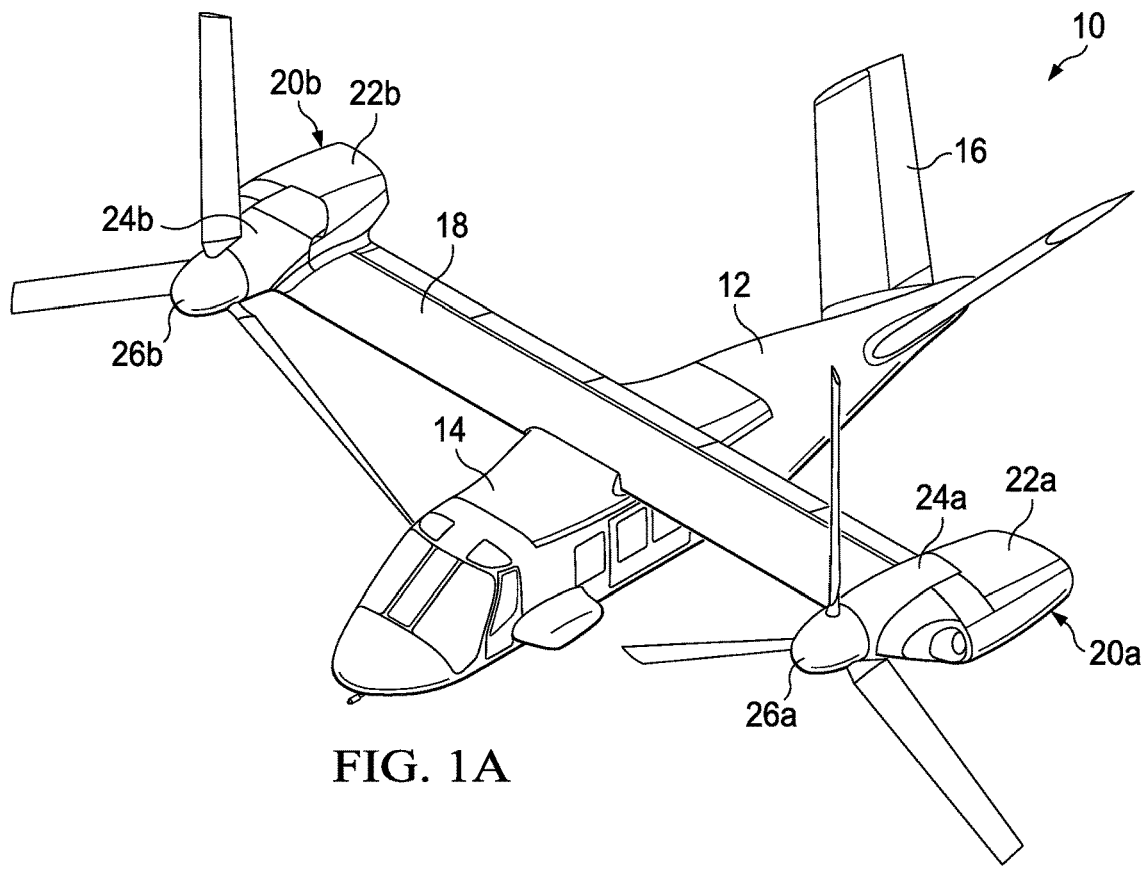
FIGS. 1A-1B illustrates a tiltrotor aircraft in accordance with implementations of various techniques described herein.
Figure 1B:
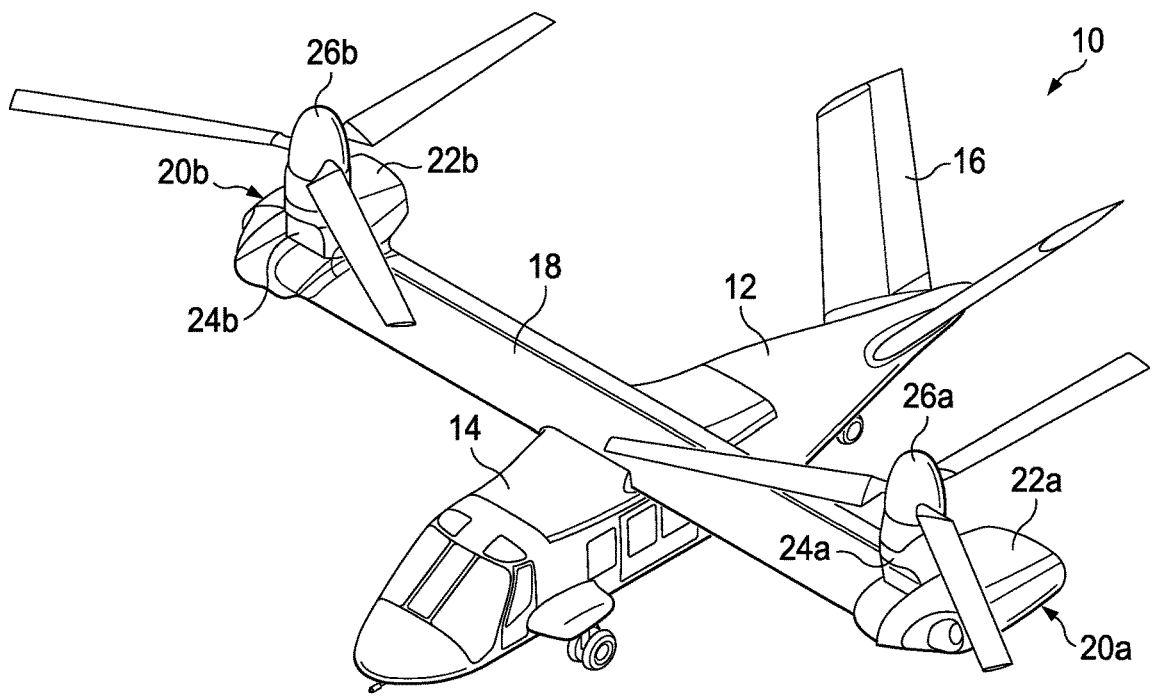

The following description provided in FIGS. 1A-1B describe an example tiltrotor aircraft where the implementations of FIGS. 2-5 may be implemented. The implementations described herein may be applied to other types of tiltrotor aircraft and are not limited to the specific type of tiltrotor aircraft described in FIGS. 1A-1B. Referring to FIGS. 1A-1B in the drawings, a tiltrotor aircraft is schematically illustrated and generally designated 10. Aircraft 10 includes a fuselage 12, a wing mount assembly 14 that is rotatable relative to fuselage 12 and a tail assembly 16 having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 to convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are propulsion assemblies 20a, 20b. Propulsion assembly 20a includes a fixed nacelle 22a that houses an engine and a fixed portion of the drive system. In addition, propulsion assembly 20a includes a pylon assembly 24a that is positioned inboard of fixed nacelle 22a and above wing 18. Pylon assembly 24a is rotatable relative to fixed nacelle 22a and wing 18 between a generally horizontal orientation, as best seen in FIG. 1A, and a generally vertical orientation, as best seen in FIG. 1B. Pylon assembly 24a includes a rotatable portion of the drive system and a proprotor assembly 26a that is rotatable responsive to torque and rotational energy provided via the engine and drive system. Likewise, propulsion assembly 20b includes a fixed nacelle 22b that houses an engine and a fixed portion of the drive system. In addition, propulsion assembly 20b includes a pylon assembly 24b that is positioned inboard of fixed nacelle 22b and above wing 18. Pylon assembly 24b is rotatable relative to fixed nacelle 22b and wing 18 between a generally horizontal orientation, as best seen in FIG. 1A, and a generally vertical orientation, as best seen in FIG. 1B. Pylon assembly 24b includes a rotatable portion of the drive system and a proprotor assembly 26b that is rotatable responsive to torque and rotational energy provided via the engine and drive system.

FIG. 1A illustrate aircraft 10 in airplane or forward flight mode, in which proprotor assemblies 26a, 26b are rotating in a substantially vertical plane to provide a forward thrust enabling wing 18 to provide a lifting force responsive to forward airspeed, such that aircraft 10 flies much like a conventional propeller driven aircraft. FIG. 1B illustrates aircraft 10 in helicopter or Vertical Take-off and Landing (VTOL) flight mode, in which proprotor assemblies 26a, 26b are rotating in a generally horizontal plane to provide a lifting thrust, such that aircraft 10 flies much like a conventional helicopter. In the illustrated embodiment, proprotor assemblies 26a, 26b each have an inboard tilt enabling proprotor assemblies 26a, 26b to produce thrust having thrust vectors with inboard angles during hover operations, which reduces the download on the airframe and the fountain effect compared proprotor assemblies that produce thrust having thrust vectors without such inboard angles, thereby improving the efficiency of hover operations. As discussed herein, the inboard tilt of proprotor assemblies 26a, 26b may be created in any suitable manner including, for example, responsive to inboard flapping of proprotor assemblies 26a, 26b, inboard mast tilt of pylon assemblies 24a, 24b relative to wing 18 and/or wing dihedral relative to fuselage 12.

It should be appreciated that when aircraft 10 is operated in airplane flight mode, proprotor assemblies 26a, 26b preferably produce thrust having thrust vectors generally parallel with the longitudinal or roll axis of aircraft 10. In addition, it should be appreciated that aircraft 10 can be operated such that proprotor assemblies 26a, 26b are selectively positioned between airplane flight mode and helicopter flight mode, which can be referred to as a conversion flight mode. Even though aircraft 10 has been described as having one engine in each fixed nacelle 22a, 22b, it should be understood by those having ordinary skill in the art that other propulsion system arrangements are possible and are considered to be within the scope of the present disclosure including, for example, having a single engine which may be housed within one of the fixed nacelles or within the fuselage that provides torque and rotational energy to both proprotor assemblies 26a, 26b.

During all flight modes, proprotor assemblies 26a, 26b rotate in opposite directions to provide torque balancing to aircraft 10. For example, when viewed from the front of aircraft 10 in forward flight mode, proprotor assembly 26a rotates clockwise and proprotor assembly 26b rotates counterclockwise. In the illustrated embodiment, proprotor assemblies 26a, 26b each include four twisted proprotor blades that are equally spaced apart circumferentially at approximately 90 degree intervals. It should be understood by those having ordinary skill in the art, however, that the proprotor assemblies of the present disclosure could have proprotor blades with other designs and other configurations including proprotor assemblies having either more than or less than four proprotor blades. Further, it should be understood by those having ordinary skill in the art that even though the present embodiments are illustrated in the context of tiltrotor aircraft 10, the embodiments of the present disclosure can be implemented on other types of tiltrotor aircraft including, for example, quad tiltrotor aircraft and unmanned tiltrotor aircraft, to name a few.

The present emergency lubrication system includes a system that is configured to adapt to demands of the system during a loss of lubrication situation. When the tiltrotor aircraft is in airplane mode and cruising at a steady altitude or descending, the power requirements of the aircraft to remain airborne are relatively low. In this situation, less lubrication may be dispensed by the emergency lube system. In airplane mode, the lubrication may be gravity fed from the lubrication chamber into the gearbox.

When the aircraft is in helicopter mode and attempting to land, the power requirements are higher and more lubrication is needed. In order to increase the flow of lubrication, pressurized material is used to push more lubrication from the lubrication chamber into the gearbox. The pressurized material may be pressurized air, pressurized gas, or pressurized liquid. As the aircraft converts from airplane mode to helicopter mode, a valve opens the passageway to allow the pressurized material to pressurize the lubrication and to force the lubrication out at a higher rate into the gearbox. Using the pressurized material allows for the dispensation of more lubrication at the moment in time when the power demands of the aircraft are higher.

The valve that opens the passageway to allow pressurized material to pressurize the lubrication may be a pendulum valve or any other weight and/or orientation based valves (e.g., valves that actuate depending on the orientation or mode of the system).

Figure 2:
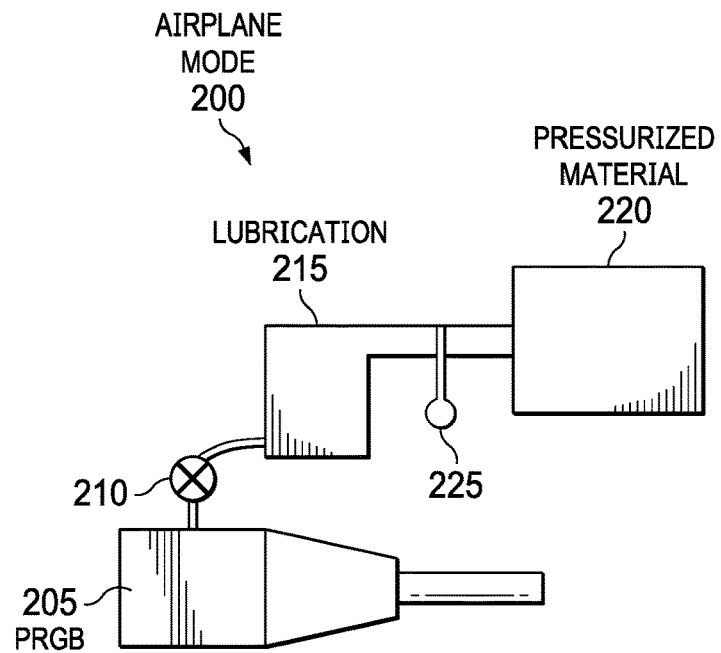
FIG. 2 illustrates a horizontal configuration of an emergency lubrication system in accordance with implementations of various techniques described herein.
Figure 3:
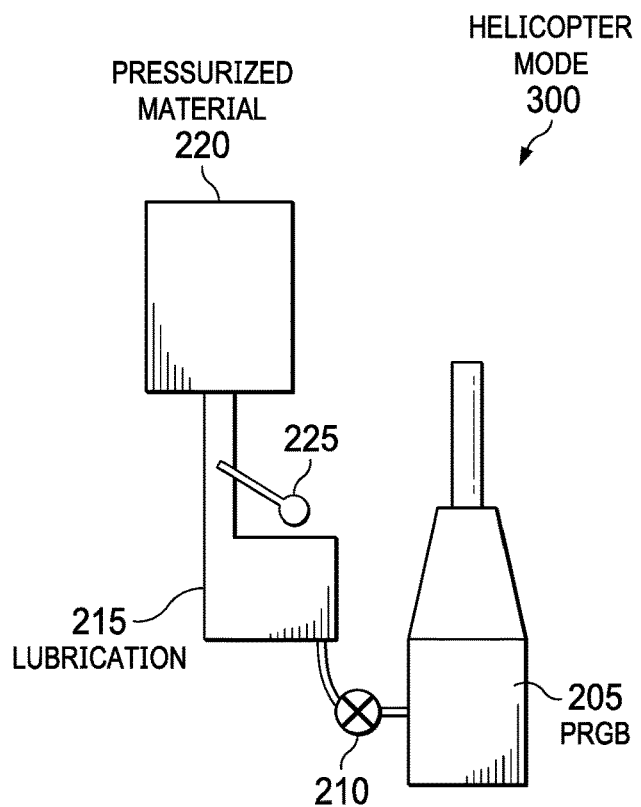
FIG. 3 illustrates a vertical configuration of the emergency lubrication system in accordance with implementations of various techniques described herein.

FIG. 2 and FIG. 3 illustrate a tiltrotor emergency lubrication system in a horizontal configuration 200 and a vertical configuration 300. FIG. 2 and FIG. 3 include a pressurized gearbox 205, a valve 210, a lubrication chamber 215, a valve 225 and a pressurized material chamber 220. The material present in the pressurized material chamber 220 may include pressurized gas, pressurized liquid, or pressurized air.

FIG. 2 discloses an airplane mode configuration 200. FIG. 3 discloses a helicopter mode configuration 300.

A loss of lubrication event can be actuated manually or automatically, e.g., using valve 210, which may be a solenoid valve. Valve 225 is used after a loss of lubrication event has already been indicated by valve 210 (e.g., when valve 210 has been actuated). The emergency lubrication system operates in different modes (e.g., drip mode or pressurized lubrication mode) depending on the mode of flight of the aircraft.

In airplane mode, as shown in FIG. 2, the emergency lubrication system is in a horizontal configuration 200. A valve 225 is coupled between the pressurized material chamber 220 and the lubrication chamber 215. Valve 210 is coupled between the lubrication chamber 215 and the pressurized gearbox 205. Subsequent to a loss of lubrication indication provided by valve 210 and while the aircraft is in airplane mode, valve 225 is closed and restricts pressure from the pressurized material chamber. The mode of operation of the emergency lubrication system when the aircraft is in airplane mode may be referred to as a drip mode or passive mode. In one implementation, valve 225 may be a weighted pendulum valve that remains closed due to the orientation of the emergency lubrication system.

In helicopter mode, as shown in FIG. 3, the emergency lubrication system is in a vertical configuration 300. Valve 225 is coupled between the pressurized material chamber 220 and the lubrication chamber 215. Valve 210 is coupled between the lubrication chamber 215 and the pressurized gearbox 205. Subsequent to a loss of lubrication indication provided by valve 210 and while the aircraft is in helicopter mode, valve 225 is open and increases the pressure from the pressurized material chamber relative to drip mode. The mode of operation of the emergency lubrication system when the aircraft is in helicopter mode may be referred to as a pressurized lubrication mode or active mode. In one implementation, valve 225 may be a weighted pendulum valve that remains open due to the orientation of the emergency lubrication system.

In one implementation, valve 225 may be partially open depending on an angle of tilt of the emergency lubrication system. In other words, the degree to which valve 225 is open or closed may correspond to a plurality of intermediate orientations of the emergency lubrication system between the horizontal configuration and the vertical configuration.

In one implementation, after a loss of lubrication indication, valve 225 may be configured to alternate between drip mode and pressurized lubrication mode. For example, the aircraft may convert from airplane mode to helicopter mode (drip mode to pressurized lubrication mode) and then back to airplane mode (pressurized lubrication mode to drip mode), if necessary. Likewise, the aircraft may convert from helicopter mode to airplane mode (pressurized lubrication mode to drip mode) and then back to helicopter mode (drip mode to pressurized lubrication mode).

Figure 4:
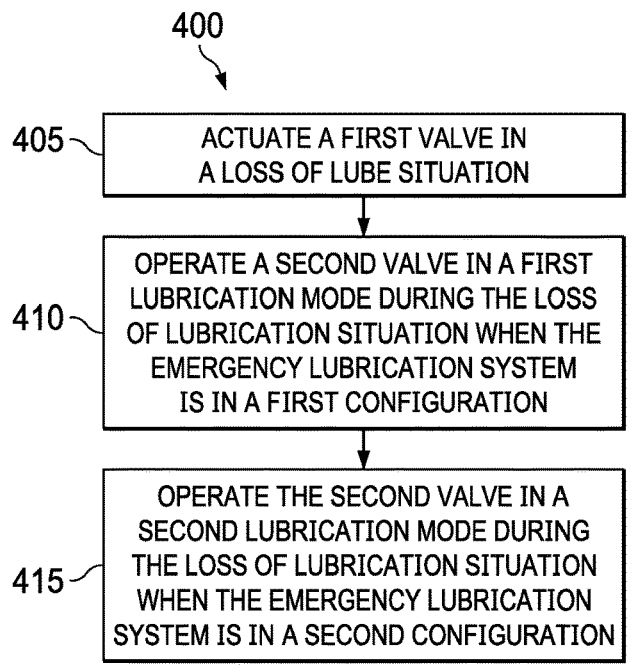
FIG. 4 illustrates diagram of a method for providing an emergency lubrication system in accordance with implementations of various techniques described herein.

FIG. 4 illustrates a method 400 for providing an emergency lubrication system in a tiltrotor aircraft. At block 405, a first valve, e.g., valve 210, is actuated to indicate a loss of lubrication situation.

At block 410, a second valve, e.g., valve 225, operates in a first lubrication mode during the loss of lubrication situation when the emergency lubrication system is in a first configuration. Subsequent to a loss of lubrication indication, e.g., provided by valve 210, and while the emergency lubrication system is in a horizontal configuration, valve 225 is closed and restricts pressure from the pressurized material chamber. The mode of operation of the emergency lubrication system when the aircraft is in airplane mode may be referred to as a drip mode or passive mode. While the emergency lubrication system is in drip mode, lubrication from lubrication chamber 215 is configured to drip into gearbox 205.

At block 415, the second valve operates in a second lubrication mode during the loss of lubrication situation when the emergency lubrication system is in a second configuration. Subsequent to the loss of lubrication indication, e.g., provided by valve 210, and while the emergency lubrication system is in a vertical configuration, valve 225 is open and increases the pressure from the pressurized material chamber relative to drip mode. The mode of operation of the emergency lubrication system when the aircraft is in helicopter mode may be referred to as a pressurized lubrication mode or active mode. While the emergency lubrication system is in pressurized lubrication mode, lubrication from lubrication chamber 215 is forced in to the gearbox 205 by pressurized material from pressurized material chamber 220.

In one implementation, the emergency lubrication system may alternate between drip mode and pressurized lubrication mode as described above in relation to FIG. 2 and FIG. 3.

Figure 5:
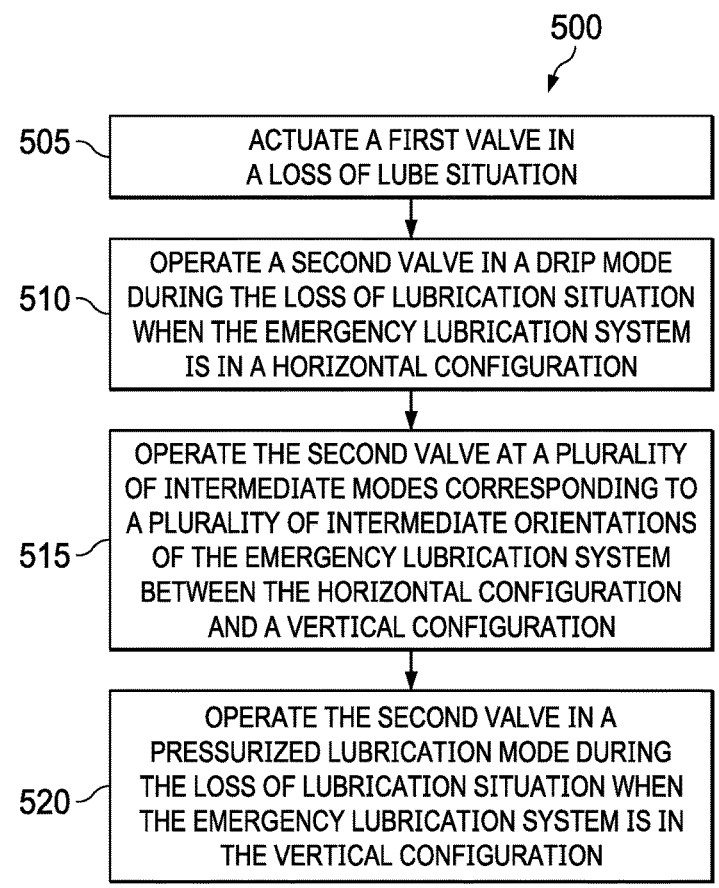
FIG. 5 illustrates a diagram of a method for providing an emergency lubrication system in accordance with implementations of various techniques described herein.

FIG. 5 illustrates a method 500 for providing an emergency lubrication system in a tiltrotor aircraft. At block 505, a first valve, e.g., valve 210, is actuated to indicate a loss of lubrication situation.

At block 510, a second valve is configured to operate in a drip mode during the loss of lubrication situation when the emergency lubrication system is in a horizontal configuration.

At block 515, the second valve operates at a plurality of intermediate modes, e.g., intermediate pressure modes, corresponding to a plurality of intermediate orientations of the emergency lubrication system between the horizontal configuration and a vertical configuration.

At block 520, the second valve operates in a pressurized lubrication mode during the loss of lubrication situation when the emergency lubrication system is in a vertical configuration.

A pressurization of lubrication may be varied from a minimum pressurization from drip mode to a maximum pressurization in pressurized lubrication mode including the plurality of intermediate orientations. In one implementation, valve 225 may be partially open depending on an angle of tilt of the emergency lubrication system. In other words, the degree to which valve 225 is open or closed may correspond to a plurality of intermediate orientations of the emergency lubrication system between the horizontal configuration and the vertical configuration.

Although FIG. 5 describes going from a drip mode (horizontal configuration or airplane mode) to a high pressure mode (vertical configuration or helicopter mode) and having a plurality of intermediate modes between, the present emergency lubrication system may also go from high pressure mode to drip mode via the plurality of intermediate modes. In this implementation, the pressurization of lubrication may be varied from a maximum pressurization in pressurized lubrication mode to a minimum pressurization in drip mode via the plurality of intermediate modes.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An emergency lubrication system for a tiltrotor aircraft, comprising:
    a pressurized material chamber;
    a lubrication chamber;
    a first valve between the pressurized material chamber and the lubrication chamber, wherein the first valve is configured to cause the lubrication system to operate in a first pressure mode in response to the emergency lubrication system being in a horizontal orientation relative to the tiltrotor aircraft and to cause the lubrication system to operate in a second pressure mode in response to the emergency lubrication system being in a vertical orientation relative to the tiltrotor aircraft;
    a gearbox; and
    a second valve between the lubrication chamber and the gearbox;
    wherein a pressure value of the second pressure mode is higher than a pressure value of the first pressure mode.

2. The emergency lubrication system of claim 1, wherein the first valve is further configured to operate in the first pressure mode and the second pressure mode upon actuation of the second valve.

3. The emergency lubrication system of claim 2, wherein the first valve is closed in the first pressure mode and open in the second pressure mode.

4. The emergency lubrication system of claim 3, wherein the first valve is partially open at a plurality of intermediate orientations between the first pressure mode and the second pressure mode.

5. The emergency lubrication system of claim 4, wherein the plurality of intermediate orientations correspond to an angle of tilt of the emergency lubrication system.

6. The emergency lubrication system of claim 1, wherein the pressurized material chamber includes pressurized gas.

7. The emergency lubrication system of claim 1, wherein the pressurized material chamber includes pressurized liquid.

8. The emergency lubrication system of claim 1, wherein the pressurized material chamber includes pressurized air.

9. The emergency lubrication system of claim 1, wherein the first valve comprises an orientation-based or weight-based valve.

10. The emergency lubrication system of claim 9, wherein the orientation-based or weight-based valve comprises a pendulum valve.

11. The emergency lubrication system of claim 10, wherein the second valve comprises a solenoid valve.

12. The emergency lubrication system of claim 1, wherein the first valve is configured to alternate between the first pressure mode and the second pressure mode.

* * * * *